Patented Aug. 2, 1949

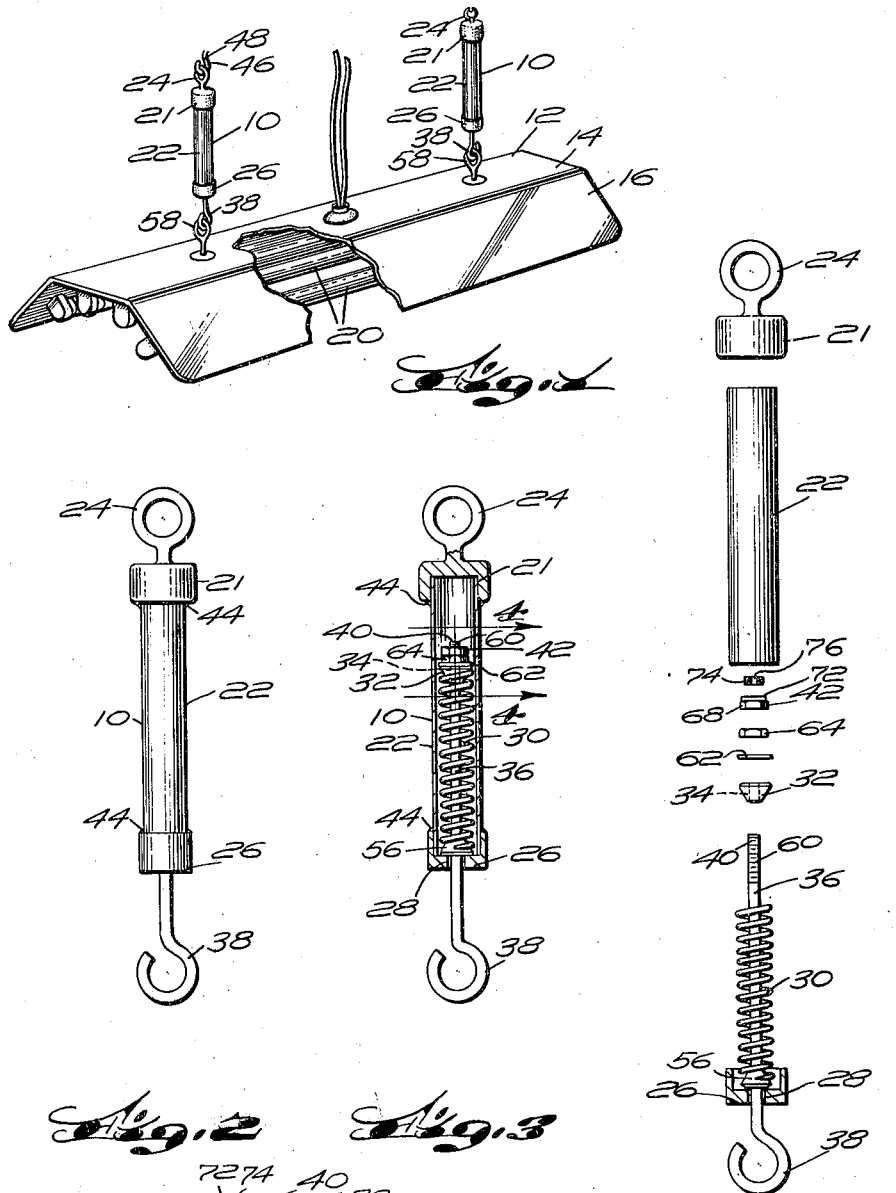

2,477,911

UNITED STATES PATENT OFFICE 2,477,911

INDUSTRIAL FLUORESCENT LAMP FIXTURE HANGER

Frank H. Travis and James Travis, Jr., Pawtucket, R. I.

Application September 16, 1946, Serial No. 697,208

2 Claims. (Cl. 248—343)

Our invention relates to improvements in industrial fluorescent lamp fixture hangers particularly adapted to support opposite ends of the elongated inverted trough shaped fixtures in which fluorescent lamp tubes are mounted for use in the factory. Great trouble has been experienced in providing a suitable hanger for fluorescent lamp fixtures for industrial use, due to the vibration of the machines in the shop or factory, which tends to loosen all present day types of hangers, and cause them to drop on the operatives in use. The situation is so bad in many factories that the operators refuse to work under a fluorescent lamp.

An object of our invention, therefore, is to provide a hanger of this type which will resiliently support the ends of the fluorescent fixtures and at the same time will positively not permit any of the parts thereof to become loose on continuous shop vibration.

Further features of our invention relate to improvements in the structure of the hanger itself.

These and such other objects of our invention as may hereinafter appear will be best understood from a description of an embodiment thereof, such as is shown in the accompanying drawings.

In the drawings, Fig. 1 is a perspective view showing hangers constructed in accordance with our invention, supporting a fluorescent lamp fixture in a factory.

Fig. 2 is a side elevation of a hanger.

Fig. 3 is a vertical sectional view taken through a hanger.

Fig. 4 is an enlarged vertical sectional view taken between the lines 4—4 of Fig. 3.

Fig. 5 is an exploded side elevation of the parts of our improved hanger.

In the drawings, wherein like characters of reference indicate like parts throughout, 10 generally indicates a fluorescent lamp fixture hanger constructed in accordance with our invention. We have shown in Fig. 1 a fluorescent lamp fixture 12 of generally inverted trough shape, having the flat upper wall 14 and the downwardly inclined side walls 16. The ordinary fluorescent tubes 20 are mounted to extend lengthwise of said fixture 12 and usually comprise sets of two of different types to more accurately simulate daylight conditions. Our improved hanger 10 comprises the tube 22 adapted to depend from the ceiling and support one end of said fixture 12 as shown in said Fig. 1, having hanging means 24 on the upper end thereof and a closed lower end 26 having a central hole 28 therein. To yieldingly support the fixture, we provide the coil spring 30 within the tube 22 seated on said closed lower end, and we provide the piston 32 having a hole 34 therein, resting on the upper end of said spring 30 and the piston rod 36 having fixture supporting means 38 on the lower end thereof extending upwardly through said hole 28 and spring 30 and having an upper end 40 extending through said hole 34 in said piston 32. To firmly secure the upper end of said piston rod 36 to said piston 32, we provide an elastic stop nut 42 positively securing said piston rod 36 to said piston 32 to withstand all shop vibration.

While our improved hanger may be constructed in any suitable manner, it is preferably constructed as follows: The closed upper end 21 of said tube comprises an upper cap member 21 secured to the upper end of said tube in any suitable manner, such as by screwing or soldering, preferably employing a hard solder 44 and having as said hanging means 24, the hook 24 adapted to have a chain or rod 48 depending from the ceiling secured thereto in any suitable manner, such as by means of the hook 46 on the end of a suitable chain 48 secured to the ceiling. As the closed lower end 26 of said tube, we also provide the lower cap 26 which is also secured to the lower end of said tube in any suitable manner, such as by securing it thereto with hard solder as shown at 44. We may, if desired, provide a seat 56 for the lower end of said spring 30 comprising a hollow truncated cone 56 resting on said cap for receiving on its inclined upper surface the lower end of said spring 30.

In the preferred embodiment shown, the piston 32 also comprises a hollow inverted truncated cone 32, having its conical surface abutting the upper end of said spring 30. The piston rod 36 has the fixture supporting hook 38 on the lower end thereof, which may be inserted within an eye 58 mounted on top of the fixture 12. The piston rod 36 extends upwardly through said cap hole 28 and spring 30 and has an upper end 40 extending through said hollow piston, having a threaded tip 60. We may also provide, if desired, the washer 62 mounted on said upper end abutting said hollow piston and a lock nut 64 threaded on said upper end. In place of the usual stop nut, however, to positively lock the piston 32 to the piston rod 36, we provide the elastic stop nut 42 shown in more detail in Fig. 4, abutting said lock nut 64, comprising a nut portion 68 on the lower end thereof, having a socket 70 on top thereof, with the upper end of the wall 72 thereof bent down over a fiber washer 74 contained within said socket 70. Said fiber washer has a central hole 76, but as the threaded tip 60 of the piston is screwed through its central hole 76, it cuts its own threads 78 therein while being forced therethrough and being fiber cannot be turned by vibration or otherwise relative to the threaded tip 60 of the piston, thereby providing a structure for positively securing said piston rod 36 to said piston 32 and all parts of our improved hanger together in such a manner as to positively withstand all shop vibration. Any suitable type, however, of elastic stop nut 42 other than that shown which has a washer 74 of suitable material so that said threaded tip 60 will cut its own threads therethrough while being inserted and be capable of binding said threads with such friction as to positively prevent any turning movement relative thereto even after much shop vibration may be employed.

It is apparent, therefore, that we have provided a novel type of hanger for industrial fluorescent lamp fixtures, with the advantages explained above.

It is understood that our invention is not limited to the specific embodiments shown and that various deviations may be made therefrom without departing from the spirit and scope of the appended claims.

What we claim is:

1. An industrial fluorescent lamp fixture hanger, comprising a tube adapted to depend from the ceiling to support one end of said fixture, an upper cap secured to the upper end of said tube having a hook, a lower cap for the lower end of said tube having a central hole therein, a coil spring contained within said tube seated on said lower cap, a piston having a hole therein resting on the upper end of said spring, a piston rod having a fixture supporting hook on the lower end thereof extending upwards through said piston having a threaded tip, a washer on said upper end abutting said piston, a lock nut threaded on said threaded tip, and an elastic stop nut abutting said lock nut comprising a nut having a socket on top thereof with the upper end of its wall bent down to rigidly contain a fibre washer having said threaded rod end cut its own threads therein as forced therethrough positively securing said piston rod to said piston to withstand all shop vibration.

2. An industrial fluorescent lamp fixture hanger, comprising a tube adapted to depend from the ceiling to support one end of said fixture, an upper cap secured to the upper end of said tube having a hook, a cap for the lower end of said tube having a central hole therein, a coil spring contained within said tube, a hollow truncated cone for receiving the lower end of the spring resting on said cap, a hollow piston comprising an inverted truncated cone having its conical surface abutting the upper end of said spring, a piston rod having a fixture supporting hook on the lower end thereof extending upwards through said cap hole, spring, and having an upper end extending through said piston having a threaded tip, a washer on said upper end abutting said hollow piston, a lock nut threaded on said threaded tip and an elastic stop nut abutting said lock nut comprising a nut having a socket on top thereof with the upper end of its wall bent down to rigidly contain a fibre washer having said threaded rod end cut its own threads therein as forced therethrough, positively securing said piston rod to said piston to withstand all shop vibration.

FRANK H. TRAVIS.
JAMES TRAVIS, Jr.

REFERENCES CITED

The following references are of record in the file of this patent:

UNITED STATES PATENTS

| Number | Name | Date |
|---|---|---|
| 182,089 | Warner | Sep. 12, 1876 |
| 207,904 | Smalley | Sept. 10, 1878 |
| 1,706,462 | O'Connor | Mar. 26, 1929 |
| 1,736,628 | Rennerfelt | Sept. 3, 1929 |
| 2,374,548 | Leisure | Apr. 24, 1945 |
| 2,437,631 | Wood | Mar. 9, 1948 |